United States Patent [19]
Cheatham et al.

[11] 3,910,533
[45] Oct. 7, 1975

[54] SPACECRAFT DOCKING AND ALIGNMENT SYSTEM

[75] Inventors: Donald C. Cheatham, Seabrook; Richard Reid, Houston, both of Tex.

[73] Assignee: The United States of America as represented by the United States National Aeronautics and Space Administration office of General Counsel-Code GP, Washington, D.C.

[22] Filed: June 15, 1973

[21] Appl. No.: 370,582

[52] U.S. Cl............... 244/161; 33/286; 35/12 C; 178/DIG. 20; 356/153
[51] Int. Cl.² .......................................... B64G 1/00
[58] Field of Search............ 244/1 SD, 161; 35/12 C, 35/12 N; 178/DIG. 20, DIG. 35, DIG. 1, DIG. 21, DIG. 33; 33/286, 1 H; 356/153

[56] References Cited
UNITED STATES PATENTS

| | | | |
|---|---|---|---|
| 3,224,709 | 12/1965 | Blizard............... | 244/1 SD |
| 3,285,533 | 11/1966 | Jernigan............. | 244/1 SD |
| 3,391,881 | 7/1968 | Maltby............... | 244/1 SD |
| 3,469,260 | 9/1969 | Holt et al.......... | 178/DIG. 1 |
| 3,564,134 | 2/1971 | Rue et al. ......... | 178/DIG. 20 |
| 3,619,912 | 11/1971 | Conant et al...... | 35/12 N |

OTHER PUBLICATIONS

"Color TV Generated By Computer To Evaluate Spaceborne Systems," Elson, Benjamin M., *Aviation Week & Space Technology*, Oct. 30, 1967, pp. 78, 81, 82.
"Satrac–Space Rendezvous System," *Astronautics*, Lawrence J. Kamm, June 1961, pp. 32, 33, 44, 46.

*Primary Examiner*—Trygve M. Blix
*Assistant Examiner*—Barry L. Kelmachter
*Attorney, Agent, or Firm*—Edward K. Fein; John R. Manning; Marvin F. Matthews

[57] ABSTRACT

A spacecraft docking alignment system is provided utilizing a three-dimensional target and screen mounted along the docking axis of one spacecraft and a television camera installed along the docking axis of the other spacecraft. A television display, with attendant electronics, is provided in the other spacecraft for viewing the relative alignment of the two spacecraft by the astronaut in control of the docking maneuver. Both spacecraft may be equipped with target, screen, camera, and display such that either spacecraft may control the docking maneuver.

13 Claims, 4 Drawing Figures

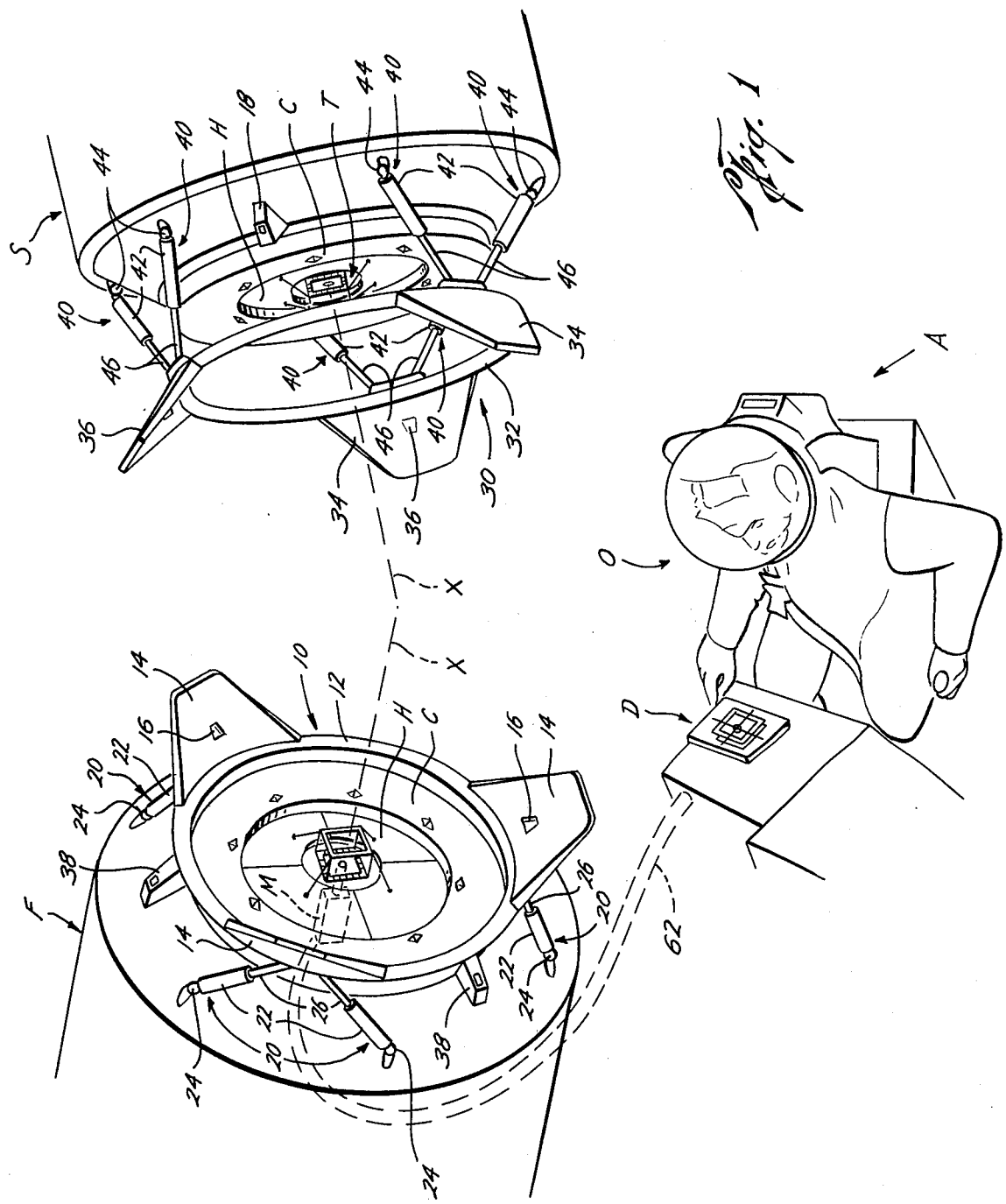

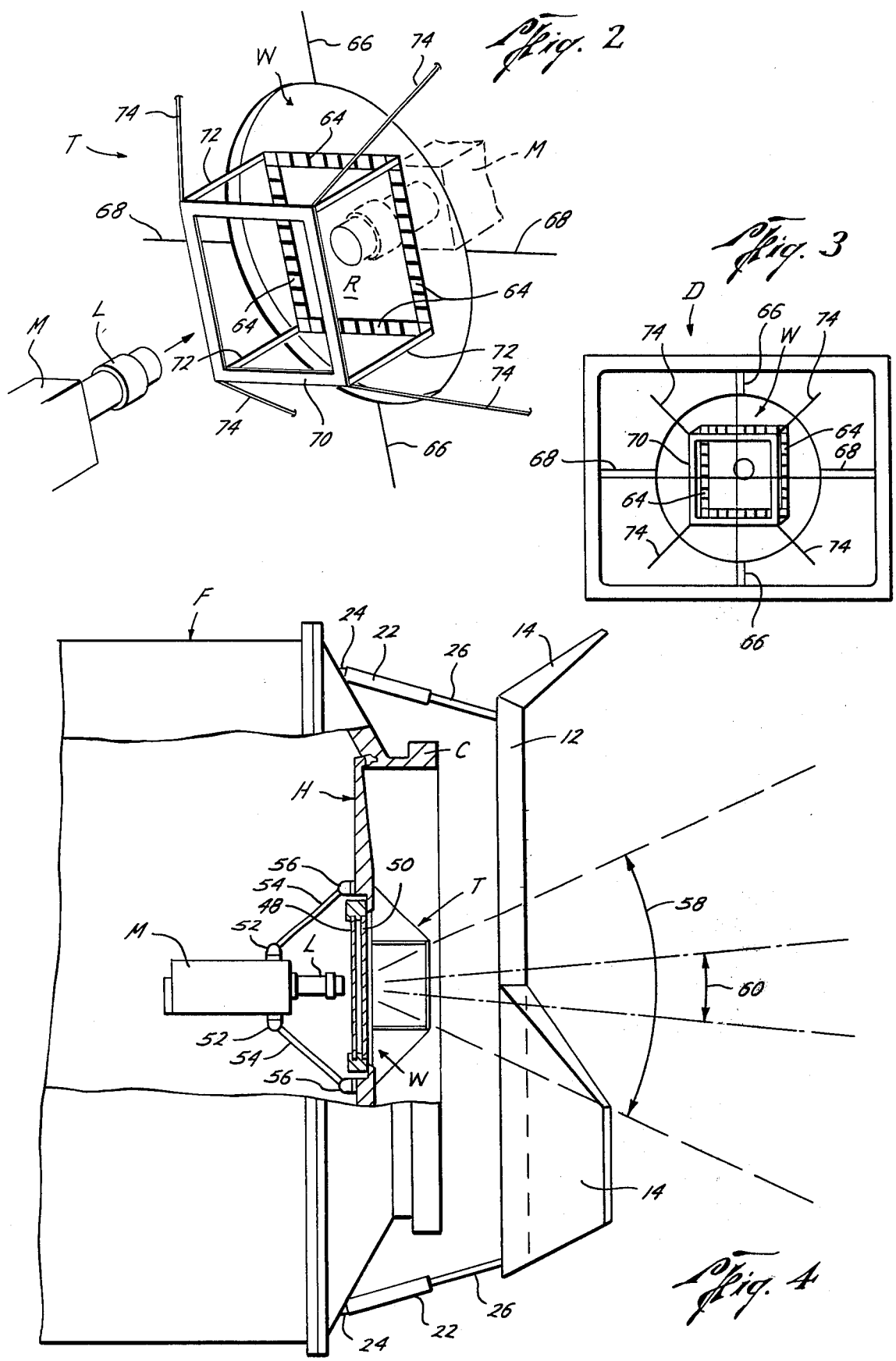

SPACECRAFT DOCKING AND ALIGNMENT SYSTEM

ORIGIN OF THE INVENTION

The invention described herein was made by employees of the U.S. Government and may be manufactured and used by or for the Government of the United States of America for governmental purposes without the payment of any royalties thereon or therefor.

BACKGROUND OF THE INVENTION

1. Field of Invention

The present invention relates to alignment and docking of spacecraft.

2. Description of the Prior Art

So far as is known, previous spacecraft alignment and docking systems have used manual control of the docking, with sighting devices mounted along a sighting axis at the spacecraft cockpit window parallel to the axis along which the docking with another craft, known as the passive craft, was to take place. A target was mounted on the passive craft along the sighting axis and offset from the docking axis by an amount corresponding to that of the sighting device on the docking spacecraft.

While these prior art systems have been generally satisfactory to date, the spacecraft currently being developed are often of significantly greater size than previous spacecraft making the docking alignment problem more difficult. Due to the considerable distance from the sighting position to the docking target, there is an increased likelihood of sighting error due to the displacement between the sighting axis and docking axis, making it difficult to maintain docking contact conditions within acceptable limits. Further, it appears desirable that future spacecraft be able to provide a docking capability with various other types of spacecraft, such as those of other countries. Using the prior art system would require a separate sighting target on a passive spacecraft for each type of active spacecraft with which possible docking might take place.

SUMMARY OF THE INVENTION

Briefly, the present invention provides a new and improved apparatus for indicating alignment along a docking axis of a first spacecraft and a second spacecraft during docking to assist the docking, having a target means mounted with the second spacecraft to provide an indication of the relative alignment between the spacecraft, a monitor means mounted with the first spacecraft for observing the target means and forming an output indication thereof to indicate and determine relative alignment between the spacecraft, and means for forming a display of the output from said monitor means. Both spacecraft may be equipped with the target means monitor means and display.

The target means and monitor means are mounted along the docking axis of the spacecraft so that relative alignment along the docking axis where docking is taking place may be monitored, thereby minimizing alignment errors.

The monitor means is preferably a television camera having a "zoom" lens or controllable focus or focal length lens in order to keep the target means in focus as the spacecraft approach each other.

The target means includes a visibly marked area on the spacecraft which is obscured from view by a screen means when the spacecraft are in alignment along the docking axis.

It is an object of the present invention to provide a new and improved apparatus for indicating relative alignment between two spacecraft during docking maneuvers.

BRIEF DESCRIPTION OF DRAWINGS

FIG. 1 is a schematic drawing of the apparatus of the present invention;

FIG. 2 is a schematic drawing of a target and monitor portion of the apparatus of the present invention;

FIG. 3 is an elevation view of a display portion of the apparatus of the present invention; and FIG. 4 is an elevation view, taken partly in cross-section, of the mounting of a monitor portion of the apparatus of the present invention with a docking hatch of the spacecraft.

DESCRIPTION OF PREFERRED EMBODIMENT

In the drawings, the letter A designates generally the apparatus of the present invention for indicating alignment between a first, or active, spacecraft F and a second, or passive, spacecraft S. It should be understood that the terms active spacecraft F and the passive spacecraft S are used for the purpose of explanation and that the passive spacecraft S may be piloted and controlled during docking with the active spacecraft F and other craft, if desired.

The spacecraft F and S have docking axes X which are to be aligned during docking maneuvers in spaceflight. The docking axes X are aligned in order that a docking hatch H formed on each spacecraft may make proper aligned contact with the docking hatch H of the other spacecraft in order to dock such spacecraft. Since the spacecraft F and S are conventional, with the exception of the apparatus A of the present invention, structural details thereof are not set forth in the drawings in order to preserve clarity therein.

The apparatus A of the present invention includes a target T (FIGS. 1 and 2) which is mounted with the second spacecraft S to provide an indication of the relative alignment between the first spacecraft F and the second spacecraft S, a monitor television camera M mounted with the first spacecraft F for observing the target means T and forming an output indication thereof in order to determine the relative alignment between the first spacecraft F and the second spacecraft S, and a television screen display means D (FIGS. 1 and 3) for forming a display of the output from the monitor M in order to assist an operator, or pilot, O of the first spacecraft F during docking. It should be understood that, as set forth in the drawings, the active spacecraft F also has a target means T mounted therewith, and that the second spacecraft S may be equipped with a monitor camera M and a display means D for docking, if desired.

A docking plate 10 in the form of an annular ring 12 having a plurality of outwardly extending docking contact plates 14 formed thereon is mounted with the first spacecraft F. The docking contact plates 14 have docking contacts 16 formed therein which are adopted to engage docking lugs 18 mounted with the second spacecraft S during docking, as is known. The docking lugs 18 are formed adjacent a collar C of the docking hatch H on the spacecraft S.

The docking plate 10 is mounted with the first spacecraft F by a plurality of docking plate support members 20. Each docking plate support member 20 includes a cylinder 22 which is pivotally mounted at a lower end 24 with the first spacecraft F. The cylinder 22 receives a piston mounted at the end of a rod 26 of the docking plate support member 20. The piston at the end of the rod 26 is adapted for movement within the cylinder 22 so that the docking plate 10 may move inwardly with respect to the first spacecraft F during docking maneuvers, in the conventional manner.

A docking plate 30 in the form of an annular ring 32 having a plurality of outwardly extending docking contact plates 34 formed therewith is mounted with the second spacecraft S. Each of the docking contact plates 34 has a docking contact 36 formed therein adapted to engage docking lugs 38 in the conventional manner, mounted with the first spacecraft F adjacent a docking hatch H thereof. The docking plate 30 is mounted with the second spacecraft S by a plurality of docking plate support members 40, each of which is in the form of a cylinder 42 pivotally mounted at a lower end 44 with the second spacecraft S and adapted to receive a piston mounted at the end of a rod 46 for movement therein in order to permit telescoping movement of the support member 40 so that the docking plate 30 may move with respect to the second spacecraft S during docking operations.

As is conventional, during docking operation when the first spacecraft F and the second spacecraft S are properly aligned, the docking lugs 38 of the first spacecraft F engage the docking contacts 36 at the second spacecraft S, while the docking lugs 18 of the second spacecraft S engage the docking contacts 16 of the first spacecraft F, forming a connection between the spacecraft F and S after the docking plates 10 and 30 have moved inwardly with respect to the docking hatches H of such spacecraft.

The monitor television camera M (FIG. 4) is mounted with the hatch H of the first spacecraft F adjacent a hatch window W having a pair of spaced panes 48 and 50 of glass or other suitable material mounted therein. The monitor television camera M has four outwardly extending brackets 52 formed therewith to receive support braces or struts 54 to mount the monitor camera M with the docking hatch H. Mounting brackets 56 are formed extending inwardly from the docking hatch H to mount the support braces 54 with the docking hatch H.

The monitor television camera M is a conventional television camera, of the miniature portable, or handheld, type and may be either a black-and-white camera or a color camera. The monitor television camera M further preferably includes a variable magnification, or "zoom" capability in a lens L thereof so that the field of vision of the camera M may be adjusted by the spacecraft operator O between a maximum field of vision as indicated by an arc 58 (FIG. 4) and a minimum field of vision as indicated by an arc 60 as the spacecraft F and S approach each other during docking operations.

In this manner, the target T may be kept in focus as the spacecrafts F and S approach each other during docking operations, so that a clear and accurate picture may be provided by the monitor camera M over a cable 62 (FIG. 1) to the display screen D, indicating to the operator O the relative alignment between the first spacecraft F and the second spacecraft S.

It is to be noted that the camera M and the target T are mounted on the docking axes X of the spacecraft F and S, respectively, thereby permitting the operator O to observe the relative alignment of the spacecraft F and S as they approach each other along the axis where docking takes place. The mounting of the camera M and the target T in this manner thus minimizes possible errors due to visual sighting along a different axis than that on which docking is taking place.

The display screen D is a conventional television picture tube, forming a visible display of the output of the monitor camera M for use by the operator O of the spacecraft F.

Considering the target T more in detail (FIG. 2), a visibly marked area in the form of a rectangle R bounded by cross-hatched lines 64 of other suitable visibly distinguishable markings is formed on the window W of the second spacecraft S. The center of the rectangle R is aligned with the docking axis of the second spacecraft S. Indicator lines 66 and 68, or cross-hairs, which intersect at the center of the rectangle R and consequently along the docking axis of the spacecraft S are formed on the hatch H of such spacecraft to further assist in alignment of the spacecraft during docking.

A screen means 70 in the form of an opaque rectangular border member mounted with the second spacecraft S spaced from the cross-hatched lines 64 by support legs 72 and support struts 74 obscures view of the cross-hatched lines 64 when the spacecraft are aligned. The center of the rectangular border member 70, in a like manner to the rectangle R, is along the docking axis of the spacecraft S. The open box configuration of the target T and the open center of the border member 70 and rectangle R thus do not interfere with the operation of the camera monitor M.

When the spacecraft are aligned, the cross-hatched lines 64 bordering the rectangle R are blocked or obscured by the screen 70 and are not visible through monitor camera M. Conversely, when the spacecraft are not aligned, the relative position of the cross-hatched lines 64 with respect to border member 70 indicates to the operator O of the first spacecraft F the relative misalignment between the spacecraft F and S so that the operator O may control the active spacecraft F to correct for the misalignment so indicated. As an example, the display D (FIG. 3) indicates a position of misalignment with the spacecraft F above, and to the right of, alignment with the docking axis X of the spacecraft F.

In the operation of the present invention, when the first spacecraft F and the second spacecraft S are to dock with each other during space maneuvers, after such spacecraft are moved to within 30 or 40 meters of each other the operator O of the first spacecraft F focuses the monitor M on the target T of the second spacecraft S. The target T when scanned by the monitor camera M and indicated on the display screen D (FIG. 3) from a position that is not an extension of the target docking axis X indicates features indicative of the misalignment between the spacecraft F and S. The operator O by observing the display screen D observes visual cues as to the existing misalignment and controls the relative movement of his spacecraft F with respect to the spacecraft S to reduce and eventually eliminate the misalignment.

From this initial position, the attitude of the active spacecraft F is adjusted with respect to the passive spacecraft S until the monitor television camera M is trained on the docking target T of the passive spacecraft S. By adjusting the lens L of the monitor camera M, the target T can be brought into focus and observed on the display screen D to detect alignment error indications. The operator O then controls the position of the active spacecraft F in order to eliminate these alignment errors and to close the range to the passive spacecraft S.

As docking contact between the spacecraft F and S is approached, the operator O continues to monitor the display screen D indicating the television presentation of the target T, adjusting the relative attitude and position of the active spacecraft F as required in order to maintain an indication of acceptable alignment on the display screen D. The monitoring of the target T by the monitor camera M and the visual indication on the display screen D to the operator O so that the operator O may continue to control the relative position between the spacecraft F and S with adjustment of the magnification or "zoom" of the lens L of the monitor M as the need arises until docking contact is obtained between the spacecraft F and S.

With the present invention, a standardized configuration of the apparatus A is thus provided which is suitable for installation on various types of spacecraft with docking hatches, providing sighting or target information as required for docking or rendezvous of such spacecraft. The apparatus A of the present invention is suitable for installation on the docking hatch H of such spacecraft along the docking axis X thereof, thereby minimizing alignment detection errors, and making such spacecraft docking compatible with other types of spacecraft and space stations of various sizes and configurations and space vehicles of other nations, also equipped with the apparatus A of the present invention, for both active and/or passive spacecraft docking roles.

The foregoing disclosure and description of the invention are illustrative and explanatory thereof, and various changes in the size, shape, and materials as well as in the details of the illustrated construction may be made without departing from the spirit of the invention.

We claim:

1. An apparatus for indicating alignment along a docking axis of a first body and a second body during docking to assist in such docking, comprising:
    a. target means mounted with the second body for providing an indication of the relative alignment between the first body and the second body, said target means including a visibly marked area on the second body and screen means mounted with the second body spaced from said visibly marked area for obscuring view of said visibly marked area when the bodies are aligned;
    b. monitor means mounted with the first body for observing said target means and forming an output indication thereof to determine the relative alignment between the first body and the second body; and
    c. means for forming a display of the output of said monitor means to assist an operator of the first body during docking.

2. The structure of claim 1, wherein said monitor means comprises:
    television camera means.

3. The structure of claim 2, wherein said television camera means comprises:
    television camera means having a variable magnification capability, wherein said target means may be kept in focus as the bodies approach each other.

4. The structure of claim 1, wherein said means for forming a display comprises:
    television screen display means.

5. The structure of claim 1 wherein said first and second bodies are spacecraft.

6. The structure of claim 5, wherein said target means comprises:
    target means mounted with a docking hatch of the second spacecraft.

7. The structure of claim 5, wherein said target means comprises:
    target means mounted on the docking axis of the second spacecraft.

8. The structure of claim 5, wherein said monitor means comprises:
    monitor means mounted with a docking hatch of the first spacecraft.

9. The structure of claim 5, wherein said monitor means comprises:
    monitor means mounted on the docking axis of the first spacecraft.

10. The structure of claim 1, wherein:
    said screen means is mounted with the body spaced from said visibly marked area along the docking axis of the second body.

11. The structure of claim 1, wherein:
    said visibly marked area comprises a rectangle bounded by cross-hatched lines.

12. The structure of claim 11, wherein said screen means comprises:
    an opaque rectangular border member mounted spaced from said visibly marked area.

13. The structure of claim 12, further including:
    support leg means for mounting said border member with the second body.

* * * * *